(12) United States Patent
Blair

(10) Patent No.: US 12,430,624 B1
(45) Date of Patent: Sep. 30, 2025

(54) WIRELESS PAYMENT, MONEY TRANSFER, AND VENDING SYSTEM

(71) Applicant: Keesha Blair, Woodbridge, VA (US)

(72) Inventor: Keesha Blair, Woodbridge, VA (US)

( * ) Notice: Subject to any disclaimer, the term of this patent is extended or adjusted under 35 U.S.C. 154(b) by 492 days.

(21) Appl. No.: 17/866,210

(22) Filed: Jul. 15, 2022

(51) Int. Cl.
```
G06Q 20/10      (2012.01)
G06Q 20/20      (2012.01)
G06Q 20/36      (2012.01)
G06Q 30/04      (2012.01)
G06Q 30/0601    (2023.01)
```

(52) U.S. Cl.
CPC ....... *G06Q 20/1085* (2013.01); *G06Q 20/102* (2013.01); *G06Q 20/20* (2013.01); *G06Q 20/3674* (2013.01); *G06Q 30/04* (2013.01); *G06Q 30/0641* (2013.01)

(58) Field of Classification Search
CPC .. G06Q 20/1085; G06Q 20/102; G06Q 20/20; G06Q 20/3674; G06Q 30/04; G06Q 30/0641
See application file for complete search history.

(56) References Cited

U.S. PATENT DOCUMENTS

| | | | | |
|---|---|---|---|---|
| 11,321,726 B1* | 5/2022 | Pandhi | ............... | G06Q 10/1095 |
| 2008/0010200 A1* | 1/2008 | Smith | ................. | G06Q 20/105 |
| | | | | 705/41 |
| 2011/0238573 A1* | 9/2011 | Varadarajan | ....... | G06Q 20/3263 |
| | | | | 705/43 |
| 2015/0254645 A1* | 9/2015 | Bondesen | ............ | G06Q 20/385 |
| | | | | 705/41 |
| 2016/0063481 A1* | 3/2016 | Gupta | ................ | G06Q 20/3223 |
| | | | | 705/72 |
| 2016/0231722 A1* | 8/2016 | Fuller | ................... | G06F 3/0482 |
| 2021/0097593 A1* | 4/2021 | Rosenfeld | .......... | G06Q 30/0641 |
| 2021/0357915 A1* | 11/2021 | Makrides | ............. | G06Q 20/384 |
| 2023/0073859 A1* | 3/2023 | Matthews | .......... | G06Q 30/0641 |

\* cited by examiner

*Primary Examiner* — A. Hunter Wilder
*Assistant Examiner* — Joseph M Mutschler
(74) *Attorney, Agent, or Firm* — John Rizvi; John Rizvi, P.A.—The Patent Professor®

(57) ABSTRACT

A wireless payment, money transfer, and vending system is disclosed. The present system acts as a digital wallet and permits the real time transaction of funds without the need for physical currency, physical cards, or even mobile phones. The system comprises a proprietary software into which a seller or a buyer may log in to transact business. The system may further comprise proprietary hardware, such as point-of-sale terminals or automated teller machines to provide additional functionality to a user. A user may access the system from anywhere the proprietary software is installed, whether they are at the transaction location or remote from the location, and may make instantaneous payments for goods or services. A user may also access the funds in their digital wallet by accessing a proprietary automated teller machine or such a machine that also integrates the proprietary software. The system proprietary software may also be installed into vending machines, and the like, to permit digital purchases.

20 Claims, 4 Drawing Sheets

WIRELESS PAYMENT, MONEY TRANSFER, AND VENDING SYSTEM

FIELD OF THE INVENTION

The present invention relates generally to funds transfer systems, and more particularly, to a wireless payment, money transfer, and vending system.

BACKGROUND OF THE INVENTION

A payment system is any system used to settle financial transactions through the transfer of monetary value. Such systems are characterized by the use of cash-substitutes, which include checks, credit and debit cards, electronic funds transfers, and e-commerce payments. These systems are used in lieu of tendering cash, while still providing near real-time transactions and funds settlement. Modernly such systems have evolved to include digital currency, currency available in virtual form, and the various methods for transacting payments in such currency. Such payment methods include, for example, Google Pay Send, Apple Pay, and Wells Fargo's card-free system.

Google Pay Send is a peer-to-peer payment service that allows users to send and receive payments though a mobile or computer software application. The service is linked by each user to their financial institution accounts and an identifying email address or telephone number, and the funds transferred through the service are taken from the sending user's account and deposited into the receiving user's account directly. Such a system, though, does not allow a user immediate access to the funds posted in their account in the form of physical currency. A user would need to access their account either through their financial institution or an ATM to convert the funds in their account to cash.

Apple Pay is a similar mobile payment and digital wallet service provided to users of Apple devices. The service digitizes a user's credit and debit cards, and also functions at contactless payment terminals, which use radio-frequency identification (RFID) and near-field communication (NFC) to enable secure payments. As with Google Pay Send, a user does not have the ability to convert their funds to physical currency through the service, and neither of the services offer the ability to generate invoices or payment requests, or to permit remote payments by a third-party user.

Wells Fargo's card-free system allows registered Wells Fargo customers to access automated teller machines (ATMs) without using their debit or ATM card. To use such a system, though, the user must have a mobile device, such as a smartphone, with the appropriate application software installed on it. The user may then log into the software and receive a one-time use code that they can enter into the ATM to access their withdrawal accounts. Such a system, though, does not act as a payment method where a user can enter their code to immediately transfer funds to a third party.

Therefore, there is a need in the art for a wireless payment, money transfer, and vending system that may allow a user to generate invoices, allow for remote payments, and permit a user to convert their funds to physical currency.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments or examples of the present disclosure, a wireless payment, money transfer, and vending system is disclosed.

In one aspect, the wireless payment, money transfer, and vending system may comprise a proprietary software.

In one aspect, the wireless payment, money transfer, and vending system may comprise a proprietary hardware.

In another aspect, the wireless payment, money transfer, and vending system may comprise a central database.

In another aspect, the wireless payment, money transfer, and vending system may comprise a mobile application software.

In another aspect, the wireless payment, money transfer, and vending system may comprise a stand-alone payment terminal.

In another aspect, the wireless payment, money transfer, and vending system may comprise digital security protocols.

In another aspect, the wireless payment, money transfer, and vending system may comprise a user information dataset.

In another aspect, the wireless payment, money transfer, and vending system may comprise a plurality of user types.

In another aspect, the wireless payment, money transfer, and vending system may comprise a card-free system.

In another aspect, the wireless payment, money transfer, and vending system may comprise automated teller machine compatibility.

In another aspect, the wireless payment, money transfer, and vending system may comprise vending machine compatibility.

In another aspect, the wireless payment, money transfer, and vending system may comprise radio-frequency identification compatibility.

In another aspect, the wireless payment, money transfer, and vending system may comprise near-field communication compatibility.

In another aspect, the wireless payment, money transfer, and vending system may be compatible with existing digital wallet systems.

Further disclosed is a wireless payment, money transfer, and vending system used for electronic commerce, comprising:
  a graphical user interface on a computer;
  a personal computing device configured to access, transfer, and withdraw monetary value in real time;
  a mechanism configured to access physical currency via at least one ATM, the ATM integrated with the personal computing device via at least one network connection;
  a plurality of user types associated with a plurality of user settings;
  wherein the user types include at least one of consumers, retailers, distributors, buyers, sellers, individual users, and business users;
  wherein the user interface varies according to a user type selected; and
  wherein an ATM allows a buyer user to log into the system and deposit physical currency funds into their own digital wallet, and allow a buyer user to authorize the payment of a seller user's invoice by depositing physical currency funds into the ATM for immediate transfer to the seller user's account, such that a configuration of the system or ATM further comprises scannable bar codes for case of user access, where the system further comprises a transaction tracking system so that a user may view, in real time, progress of any transactions to which they are privy.

In another aspect, the system is configured to allow a buyer user to log into the system and set their user type as a buyer, and be given access to a buyer user interface, such that from the buyer user interface the buyer user is given the option to enter a plurality of buyer's information, the buyer's information including at least one of payment and financial information, credit card data, bank account data, electronic benefit transfer (EBT) data, and cryptocurrency data; and wherein the system acts as a digital wallet for the buyer user, allowing the buyer user to access and transfer funds without a need for carrying physical currency or physical cards;

wherein a seller user is loggable into the system to set their user type as a seller, and be given access to a seller user interface, such that from the seller user interface the user is given an option to enter a plurality of seller's information, wherein the seller's information includes at least one of an inventory of goods and their associated prices; and wherein the seller user is provided an option to enter additional appropriate information, where the appropriate information includes at least one of available sales and discounts that are offered on their goods; and wherein the seller user is provided an option to track their inventory and sales in real time, and to generate invoices related to sales done through the system;

wherein the seller user is provided an option to enter payment and financial information, such that the combination of user types interact within the system to generate electronic commerce; and wherein in generating electronic commerce, the buyer user is provided an option to access a physical point of sale (POS) of the seller user and to purchase certain goods or services made available by the seller user.

In another aspect, the seller user is provided an option to access the seller user interface and prepare an invoice for the buyer user, by at least one of manually entering information related to goods and prices into the system, and by having information entered automatically by scanning a bar code on goods that are associated within the system with prices and inventory information, or by selecting the goods from a list generated by an algorithm on entered seller's information.

In another aspect, once an invoice has been prepared, the seller user is provided an option to send a payment request to a buyer user, via at least one of a specially configured hardware POS terminal, such that the seller user can grant the buyer user access to the POS terminal.

In another aspect, the buyer user is provided an option to access the system to conclude a transaction, such that the buyer user authorizes a transaction to permit an immediate electronic transfer of funds to a seller's user account.

In another aspect, a seller user is provided an option to digitally deliver a payment request to a buyer user by entering the buyer user's mobile phone number, email address, or other unique identifying information, such that the system delivers the invoice to the buyer user's inbox within the system, and notifies the user of receipt of a new or outstanding invoice, such that a notification is sent by text message to a user's mobile phone, by e-mail message to the user's e-mail provider, or by push notification to the user's mobile phone.

In another aspect, the buyer user is given the option to log into their buyer user interface to receive a payment request, and authorize a transaction to permit an immediate electronic transfer of funds to a seller's user account.

In another aspect, a bar code provides an option for a seller user or a buyer user to access data within the system, create an invoice at their POS terminal or on a computer or mobile device and generate a scannable bar code that is displayed on the seller's user interface.

In another aspect, a buyer user is provided an option to scan a bar code displayed on the seller's user interface using a camera on their mobile device, which automatically loads the invoice into the buyer's user interface.

In another aspect, a seller is provided an option to create an invoice and the buyer to generate a scannable bar code that is displayed on the buyer's user interface, which the seller is provided an option to scan using a camera device to authorize the transaction.

In another aspect, the system provides an option for a buyer user to purchase goods or services without the need for carrying physical currency or physical cards.

In another aspect, the system provides an option for the buyer user to transfer payment to the seller user via a personal computing device while at the seller's POS, or by logging into a seller's POS.

In another aspect, the system provides an option for authorization of a transaction remotely via presence at a seller's POS and to begin a purchase process.

In another aspect, the system provides an option for a seller to generate an invoice related to a purchase, and send a payment request to a third-party buyer user not at a POS location for their authorization.

In another aspect, to protect user accounts, the system is configured to manage an individual user's digital wallet across all of their financial accounts, transfer funds between their accounts integrated into their profile within the system, and transfer funds to the accounts of other users within the system without making a purchase of goods or services, such that the user is provided a configuration to request a transfer of funds from another user within the system, and this request is configured to be sent to another other user's phone number or email address for authorization prior to commencement of a transfer, such that a requesting user is provided a configuration to be presented with a scannable bar code, or a sending user is provided a configuration to provide a scannable bar code, that the other user is provided a configuration to scan to request or authorize such a transfer of funds between users.

In another aspect, the system is configured to be used for accessing physical currency, at least via accessing electronic funds in a digital wallet to have dispensed as physical currency, and/or such that currency is stored in and dispensed from an existing ATM integrating with the system, and such that the user accesses an ATM user interface installed on an appropriate ATM, and enter a requested withdrawal amount.

In another aspect, an ATM can send a withdrawal request to a user by displaying a request directly on an ATM or by sending a request to the user's phone number or email, such that the user is provided a configuration to log into their user interface directly through an ATM, or via their mobile device, and such that the user is provided a configuration to authorize a withdrawal and a deduction of funds from their digital wallet, and such that a withdrawal request is sent to a remote, third-party user, who may authorize the withdrawal request such that physical currency is transferred immediately without the need for both users being present.

In another aspect, a user is able to access electronic funds in their digital wallet to purchase physical goods from vending machines integrating with the system, such that the user accesses a vending machine user interface installed on an appropriate vending machine, and such that the user is presented a configuration to enter a purchase request from a displayed inventory; and wherein a vending machine sends a purchase request to a user by displaying a request directly on the vending machine or by sending the request to a user's phone number or email, such that a user is presented with a configuration to log in to their user interface directly through a vending machine, or via their mobile device, to authorize a purchase and a deduction of funds from their digital wallet, where the vending machine dispenses purchased goods, and such that a purchase request is sent to a remote, third-party user, who is provided a configuration to authorize a purchase request such that physical goods are purchased without a need for the authorizing user to be present, and such that a proprietary software installed on a vending machine comprises a scannable bar code for ease of user access.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
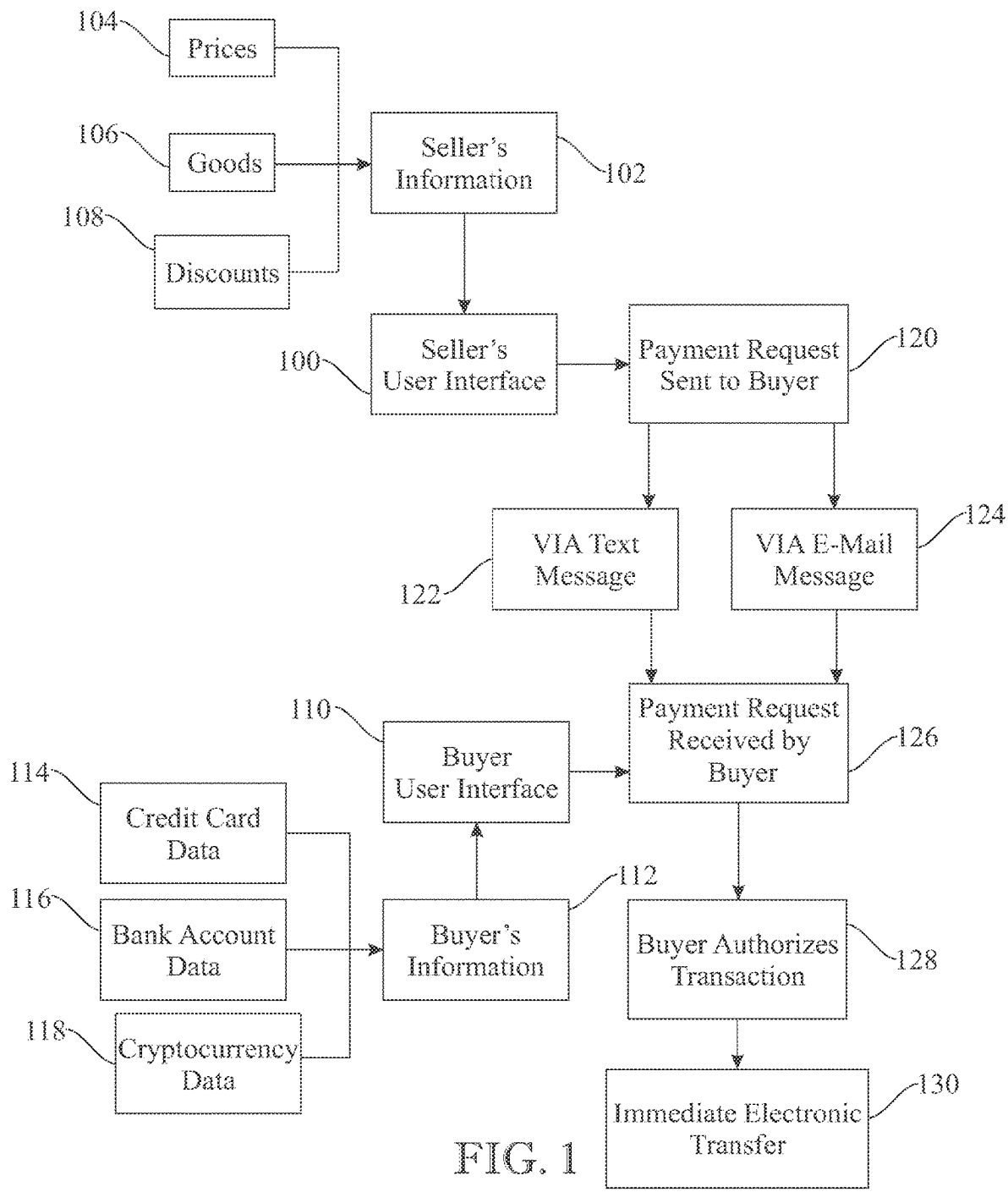
FIG. 1 illustrates an overview of a wireless payment, money transfer, and vending system used for electronic commerce, in accordance with aspects of the present disclosure.

The illustration of FIG. 1 illustrates an overview of a wireless payment, money transfer, and vending system used for electronic commerce. The system comprises, generally, a proprietary software, having a user interface on a computer, a mobile device, or a proprietary hardware, and which may be used to access, transfer, and withdraw monetary value in real time. The system is intended to eliminate the need for a user to carry currency or credit and debit cards on their person, and may provide the ability for a user to pay for items and transfer funds by accessing the proprietary software from their computing device or a dedicated terminal. The user may further gain access to physical currency through the use of automated teller machines (ATMs) integrating the proprietary software. The system may comprise a plurality of user types, and may further associate a plurality of user settings with each of such user types.

To begin using the system a user may access the proprietary software by downloading it to a computer or mobile device, and may then log into the system. The log in process may involve the user selecting a unique user name and password and selecting a user type. The user types may include, for example, consumers, retailers, distributors, buyers, sellers, individual users, business users, or any other appropriate types. The user interface of the proprietary software may vary in available selections based on the user type selected.

By way of example, a buyer user may log into the system and set their user type as a buyer, and may then be given access to a buyer user interface 110. From the buyer user interface 110 the buyer user may be given the option to enter a plurality of buyer's information 112, which may include payment and financial information such as, for example, credit card data 114, bank account data 116, electronic benefit transfer (EBT) data, and cryptocurrency data 118. In this way the system may act as a digital wallet for the buyer user, allowing the buyer user to access and transfer funds, as needed, without the need for carrying currency or physical cards.

By way of a second example, a seller user may log into the system and set their user type as a seller, and may then be given access to a seller user interface 100. From the seller user interface 100 the seller user may be given the option to enter a plurality of seller's information 102, which may include an inventory of goods 106 and their associated prices 104. The seller user may also enter additional appropriate information, such as available sales or discounts 108 that are offered on their goods 106. With such information entered into the system, the seller user may be able to track their inventory and sales in real time, and may be able to generate invoices related to sales done through the system. The seller user may also have the option to enter payment and financial information, as with the buyer user, so that the combination of user types may use the system as an electronic commerce (e-commerce) platform.

To use the system as an e-commerce platform, the buyer user may, for example, access a physical point of sale (POS) of the seller user and may wish to purchase certain goods or services made available by the seller user. The seller user may access the seller user interface 100 and prepare an invoice for the buyer user, which may be done in any appropriate manner such as, for example, by manually entering information related to the goods 106 and prices 104 into the system, or by having the information entered automatically by scanning a bar code on the goods 106 that is associated within the system with the prices 104 and inventory information, or by selecting the goods 106 from a list generated by the proprietary software based on the entered seller's information 102.

Once the invoice has been prepared the seller user may send a payment request to the buyer user 120, which may be sent by any appropriate means. In an embodiment wherein the seller user is using a proprietary hardware POS terminal having the proprietary software installed thereon, for example, the seller user may simply grant the buyer user access to the POS terminal. Similarly, in an embodiment wherein the seller user is using the proprietary software on a computer or mobile device, the buyer user may access the proprietary software on the device to conclude the transaction. In either case the buyer user may log into the proprietary system using their user credentials, and may authorize the transaction 128 to permit the immediate electronic transfer of funds 130 to the seller's user account.

In another embodiment the seller user may digitally deliver the payment request 120 to the buyer user by entering the buyer user's mobile phone number, email address, or other unique identifying information. The proprietary system may then deliver the invoice to the buyer user's inbox within the system, and notify the user of the receipt of a new or outstanding invoice. Such notification may be performed, for example, by text message 122 to the user's mobile phone, by e-mail message 124 to the user's e-mail provider, by push notification to the user's mobile phone, or by any other appropriate means. The buyer user may then log into their buyer user interface 110 to receive the payment request 126, and may authorize the transaction 128 to permit the immediate electronic transfer of funds 130 to the seller's user account.

The proprietary software may further comprise a bar code or similar system to permit a seller user or a buyer user to more easily access data within the system. By way of example, the seller user may create an invoice at their POS terminal or on their computer or mobile device and may then generate a scannable bar code that is displayed on the seller's user interface 100. The buyer user may then scan the bar code displayed on the seller's user interface 100 using the camera on their mobile device, which may automatically load the invoice into the buyer's user interface 110. By way of a second example, the seller may create the invoice and the buyer may generate a scannable bar code that is displayed on the buyer's user interface 110, which the seller may then scan using a camera device, or other appropriate scanning device, to authorize the transaction 128.

By the implementation of such a system it is contemplated that the proprietary allows a buyer user to purchase goods or services without the need for carrying currency or physical cards. The buyer user may transfer payment to the seller user via the proprietary software on their mobile device while at the seller's POS, or may simply log into the proprietary software on the seller's POS, removing even the need for the user to access their own mobile device.

In one embodiment, the buyer user may not even be present at the seller's POS, and may authorize the transaction 128 remotely using the proprietary software. By way of example, a buyer user may be present at the seller's POS and may begin the purchase process. The seller may generate an invoice related to the purchase, and may send the payment request 120 to a third-party buyer user not at the location for their authorization 128. Children, for example, purchasing tickets at a movie theater may have the payment request 120 sent to their parents, who may be at home or at a different location, and who may receive notification of the payment request 126 and may authorize the transaction 128 via their own user interface 110.

To protect the various user accounts, user data, and transactions it is contemplated that the proprietary software may implement modern data security and encryption protocols. By way of example, the proprietary software may implement the advanced encryption standard (AES), the triple data encryption standard (3DES), the twofish standard, the Rivest, Shamir, Adelman standard (RSA), or any other appropriate encryption protocol. It is contemplated that the proprietary software may implement, at least, 128-bit encryption, though more difficult encryption, such as, for example, 192-bit or 256-bit, may be implemented as desired. The proprietary software may further comprise online identity verification protocols to ensure a user is authorized to access the various financial accounts listed in their profile and to prevent fraudulent money transfers.

As contemplated by the present disclosure, the proprietary software of the system may also be used to manage an individual user's digital wallet across all of their financial accounts. The user may electronically transfer funds between their accounts integrated into their profile within the system, and may transfer funds to the accounts of other users within the system without making a purchase of goods or services. The user may also request a transfer of funds from another user within the system, and this request may be sent to the other user's phone number or email address for authorization prior to the commencement of the transfer. A requesting user may also be presented with a scannable bar code, or a sending user may provide a scannable bar code, that the other user may scan to request or authorize such a transfer of funds between users.

Figure 2:
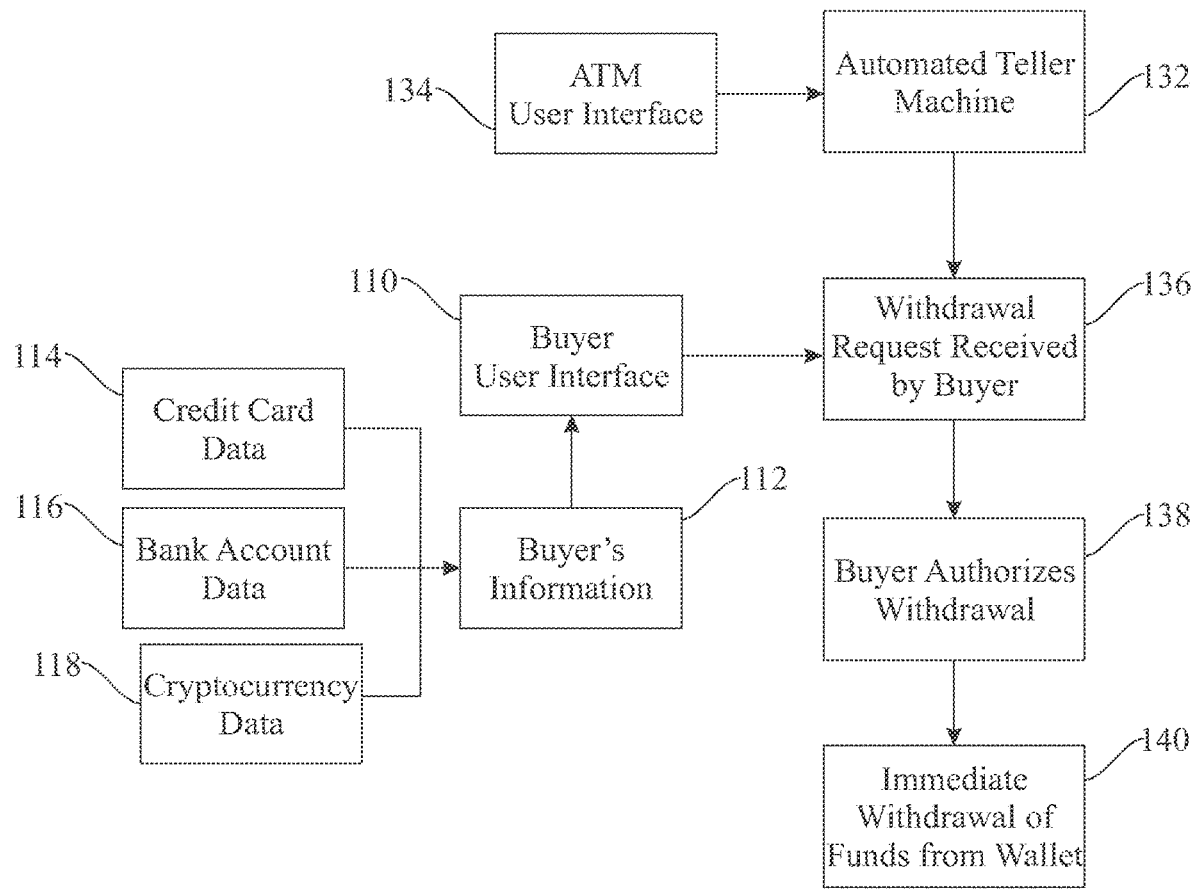
FIG. 2 illustrates an overview of a wireless payment, money transfer, and vending system used for accessing physical currency, in accordance with aspects of the present disclosure.

The illustration of FIG. 2 illustrates an overview of a wireless payment, money transfer, and vending system used for accessing physical currency. In one embodiment, a user may be able to access the electronic funds in their digital wallet to have dispensed as physical currency. Such currency may be stored in and dispensed from an existing ATM integrating the proprietary software or from proprietary ATM hardware. In either case, the user may access the ATM user interface 134 installed on an appropriate ATM 132, and may enter a requested withdrawal amount.

The ATM 132 may then send a withdrawal request to the user 136, whether by displaying the request directly on the ATM 132 or by sending the request to the user's phone number or email. The user may then log in to their user interface 110 directly through the ATM 132, or via their mobile device, and may authorize the withdrawal 138 and the deduction of the funds from their digital wallet 140. In one embodiment the withdrawal request 136 may be sent to a remote, third-party user, who may then authorize the withdrawal request 138 so that physical currency may be transferred immediately without the need for both users being present.

In one embodiment, the ATM 132 may allow a buyer user to log into the proprietary software and deposit physical currency funds into their own digital wallet, or may allow a buyer user to authorize the payment of a seller user's invoice by depositing physical currency funds into the ATM 132 for immediate transfer to the seller user's account. The proprietary software installed on an ATM 132 may further comprise scannable bar codes for ease of user access. The proprietary software may further comprise a transaction tracking system so that a user may view, in real time, the progress of any transactions to which they are privy.

Figure 3:
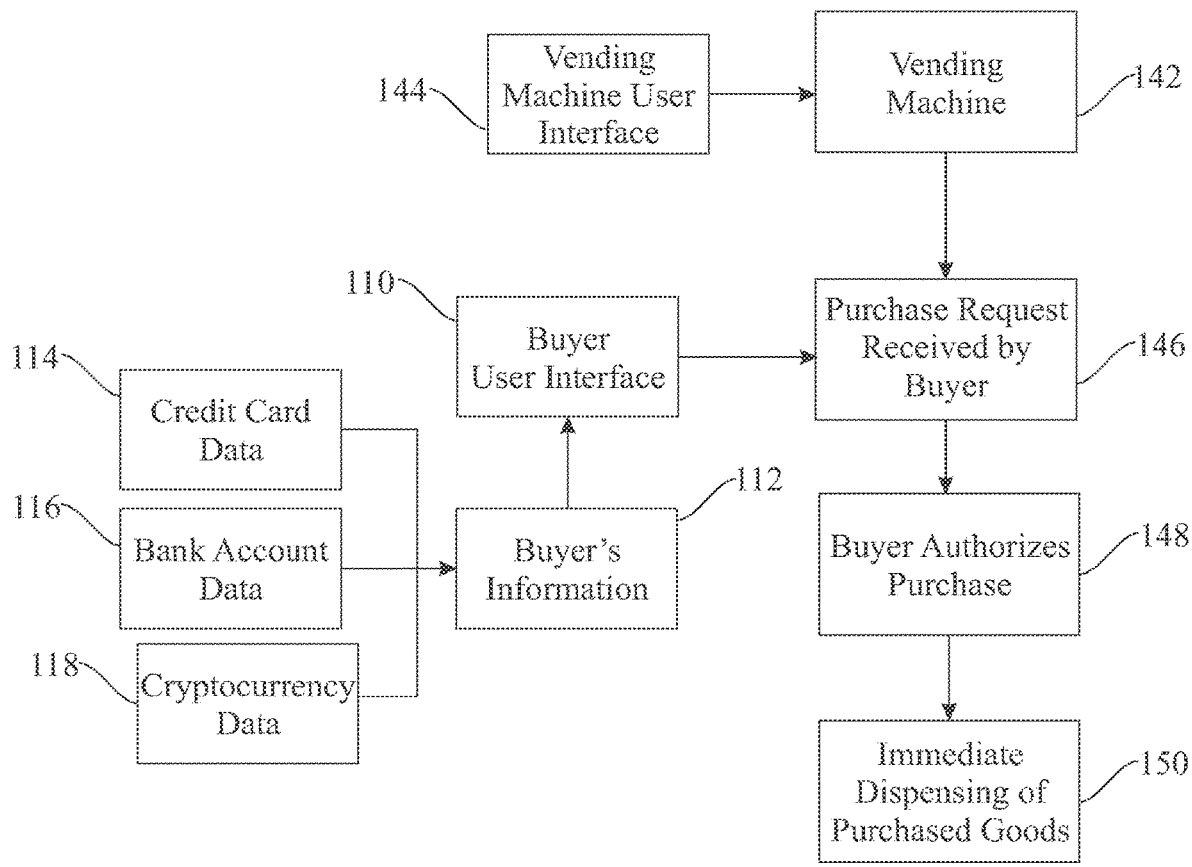
FIG. 3 illustrates an overview of a wireless payment, money transfer, and vending system used for accessing a vending machine, in accordance with aspects of the present disclosure.

The illustration of FIG. 3 illustrates an overview of a wireless payment, money transfer, and vending system used for accessing a vending machine. In one embodiment, a user may be able to access the electronic funds in their digital wallet to purchase physical goods from vending machines integrating the proprietary software. The user may access the vending machine user interface 144 installed on an appropriate vending machine 142, and may enter purchase request from the displayed inventory.

The vending machine 142 may then send a purchase request to the user 146, whether by displaying the request directly on the vending machine 142 or by sending the request to the user's phone number or email. The user may then log in to their user interface 110 directly through the vending machine 142, or via their mobile device, and may authorize the purchase 148 and the deduction of the funds from their digital wallet. The vending machine may then dispense the purchased goods 150. In one embodiment the purchase request 146 may be sent to a remote, third-party user, who may then authorize the purchase request 148 so that physical goods may be purchased without the need for the authorizing user to be present. The proprietary software installed on a vending machine 142 may further comprise scannable bar codes for ease of user access.

Figure 4:
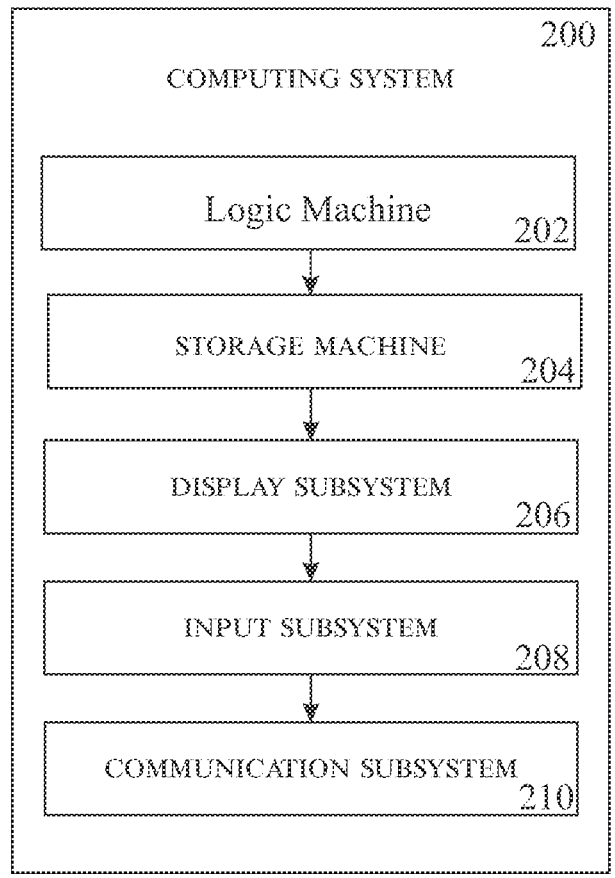
FIG. 4 schematically presents a computing system configured to carry out and actualize methods and tasks described herein, in accordance with aspects of the present disclosure.

The illustration of FIG. 4 schematically presents a computing system that may represent an embodiment of the present invention. In some embodiments the method is executed on a computing system such as computing system 200. For example, storage machine 204 may hold instructions executable by logic machine 202 to provide the method to users. Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above. The described method may be executed, provided or implemented to a user on one or more computing devices via a computer-program product such as via an application programming interface (API). Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

In conclusion, disclosed is a system that allows ATM money transfer, for sending and receiving money, allows real-time transfer payments to remote $3^{rd}$ parties, allows login to the system and payment without or with a card and/or a phone, and allows payment and money transfer via a vending machine system.

The system allows payment without currency or credit cards, and may be configured to use access codes without cards. A standalone payment terminal may integrate into existing EDCs and/or new EDCs (electronic data capture/payment terminals). The system syncs with Electronic Benefit Transfer (EBT) with no card necessary. The system provides high security, real-time, money transfer to merchants, allows mobile payments using an app, and provides unique user account login/codes. A payment machine scans barcodes on cell phones to effect any of the processes disclosed herein.

The system effects a process, where an app populates an invoice/payment request to submit to a payer via a mobile phone or email address. The system allows remote payment, which can be sent to any payer, and the payer does not need to be present.

The benefits of the system include, eliminating the need to carry currency/credit cards, and the option to pay even without a cell phone, and a remote payment option. The system allows the sending of an invoice/payment request to customer mobile phone or email addresses. The system allows remote payment, which can be sent to any customer, and the customer does not need to be in the store. The customer does not need to have a cell phone to pay using the system.

Regarding ATM money transfer, a sender may send funds via the mobile app or by using an ATM, bank/credit union, or merchant's software, can make deposit/money transfer with or without cash/credit card, can send money to a receiver cell phone/email address, and can view the transaction tracking progress. The receiver may collect funds at ATMs, bank/credit unions, and merchants, can make withdrawal without cell phones (account login) or use scanning bar options (which may be sent to text/email), can transfer the money into their financial institution instead of withdrawing cash, and can view the transaction tracking progress. In the ATM money transfer process, the sender transfers money to a receiver (the receiver may be self), the receiver is notified via cell phone/email, and the receiver goes to bank/credit unions, ATMs, or merchants to collect cash. Funds are immediately available.

The system allows the scanning of a barcode at an ATM, and provides a unique login (cell phone/credit card not needed). The software of the system syncs with existing and new ATMs (this function is added to existing ATM operations, where ATM software may include GPS tracking). The system has high security and eliminates compromise. The system may require mandatory positive identification for all users (e.g. partner with creditable online identity verification company, e.g. MiiCard, DMV, etc). Transactions may be initiated and/or completed at banks, credit unions, or ATMs. Transactions may be initiated via a mobile app. The system may partner with merchants such as WALMART or CVS for example. The system allows users to select a receiver, withdraw, or select a sender, and deposit. A balance transfer option may be provided for one or more transaction types.

The disclosed system allows ATMs to interface with the disclosed app to allow instant money transfer and pick up. Existing money transfer services do not allow funds to be dispensed by ATMs, and the disclosed system solves this problem. Cardless access may be allowed regardless of bank/credit union ATM. The system allows immediate transfer and pickup of funds. The system allows for faster transactions and lower fees (which may be on the order of $5 transaction fees charged to a sender, as a non-limiting example). The system allows users to send and receive money at any moment.

With respect to vending machines, the system syncs with apps (i.e. smart vending). The system integrates software into new vending machines, and also existing vending machines. The system can be used with or without currency/credit cards (e.g. an access code may be used instead of a card). A user account login/codes may be used to store, send, or access money. The system has the option of receiving funds on an account from another customer, and allows mobile payment via an app through the vending machine. The vending machine scans a barcode from an application/text/email for faster transactions. The system may allow credit card payments from the vending machine, and may provide vendor tracking and out of stock alerts. The process for such vending machines may include, a customer logging in via a vending machine (e.g. with or without a phone) or a mobile app (e.g. scanning a barcode on a phone), the vending machines receiving and/or sending a payment alert, the customer making a selection, and an item being dispensed.

As a non-limiting example, the disclosure teaches action by a processor to execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented.

Therefore the disclosed technical solutions eliminate or alleviate these problems and positively contribute to the technical abilities of existing computing systems and methods.

As a non-limiting example of such a practical application, embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (for example using an Internet Service Provider), or the connection may be made to external computers. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to schematic flowchart illustrations and/or block diagrams of methods, apparatus (systems), functions, and computer program products according to embodiments of the invention. It will be understood that each block of the flowchart illustrations and/or block diagrams, and combinations of blocks in the flowchart illustrations and/or block diagrams or functions, can be implemented by computer readable program instructions. Functions, including policy functions, are groups of computer readable program instructions grouped together that can be invoked to complete one or more tasks.

These computer readable program instructions may be provided to one or more processors of one or more general purpose computers, special purpose computer, or other programmable data processing apparatus to produce a machine, such that the instructions, which execute via the processors of the one or more computers or other programmable data processing apparatus, create means for implementing the functions/acts specified in the flowchart and/or block diagram block or blocks. These computer readable program instructions may also be stored in one or more computer readable storage mediums that can direct one or more computers, programmable data processing apparatuses, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the one or more computers, other programmable apparatuses or other device to produce a computer implemented process, such that the instructions which execute on the computers, other programmable apparatus, or other devices implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A wireless payment, money transfer, and vending system used for electronic commerce, comprising:
   a graphical user interface on a computer;
   a personal computing device configured to access, transfer, and withdraw monetary value in real time;
   a mechanism configured to access physical currency via at least one ATM, the ATM integrated with the personal computing device via at least one network connection;
   a plurality of user types associated with a plurality of user settings;
   wherein the user types include at least one of consumers, retailers, distributors, buyers, sellers, individual users, and business users;
   wherein the user interface varies according to a user type selected; and
   wherein an ATM allows a buyer user to log into the system and deposit physical currency funds into their own digital wallet, and allow a buyer user to authorize the payment of a seller user's invoice by depositing physical currency funds into the ATM for immediate transfer to the seller user's account, such that a configuration of the ATM further comprises scannable bar codes for ease of user access, where the system further comprises a transaction tracking system so that a user may view, in real time, progress of any transactions to which they are privy.

2. The system of claim 1, wherein the system is configured to allow a buyer user to log into the system and set their user type as a buyer, and be given access to a buyer user interface, such that from the buyer user interface the buyer user is given the option to enter a plurality of buyer's information, the buyer's information including at least one of payment and financial information, credit card data, bank account data, electronic benefit transfer (EBT) data, and cryptocurrency data; and
   wherein the system acts as a digital wallet for the buyer user, allowing the buyer user to access and transfer funds without a need for carrying physical currency or physical cards;
   wherein a seller user is loggable into the system to set their user type as a seller, and be given access to a seller user interface, such that from the seller user interface the user is given an option to enter a plurality of seller's information, wherein the seller's information includes at least one of an inventory of goods and their associated prices; and
   wherein the seller user is provided an option to enter additional appropriate information, where the appropriate information includes at least one of available sales and discounts that are offered on their goods; and wherein the seller user is provided an option to track their inventory and sales in real time, and to generate invoices related to sales done through the system;

wherein the seller user is provided an option to enter payment and financial information, such that the combination of user types interact within the system to generate electronic commerce; and wherein in generating electronic commerce, the buyer user is provided an option to access a physical point of sale (POS) of the seller user and to purchase certain goods or services made available by the seller user.

3. The system of claim 1, wherein the seller user is provided an option to access the seller user interface and prepare an invoice for the buyer user, by at least one of manually entering information related to goods and prices into the system, and by having information entered automatically by scanning a bar code on goods that are associated within the system with prices and inventory information, or by selecting the goods from a list generated by an algorithm on entered seller's information.

4. The system of claim 1, wherein once an invoice has been prepared, the seller user is provided an option to send a payment request to a buyer user, via at least one of a specially configured hardware POS terminal, such that the seller user can grant the buyer user access to the POS terminal.

5. The system of claim 1, wherein the buyer user is provided an option to access the system to conclude a transaction, such that the buyer user authorizes a transaction to permit an immediate electronic transfer of funds to a seller's user account.

6. The system of claim 1, wherein a seller user is provided an option to digitally deliver a payment request to a buyer user by entering the buyer user's mobile phone number, email address, or other unique identifying information, such that the system delivers the invoice to the buyer user's inbox within the system, and notifies the user of receipt of a new or outstanding invoice, such that a notification is sent by text message to a user's mobile phone, by e-mail message to the user's e-mail provider, or by push notification to the user's mobile phone.

7. The system of claim 1, wherein the buyer user is given the option to log into their buyer user interface to receive a payment request, and authorize a transaction to permit an immediate electronic transfer of funds to a seller's user account.

8. The system of claim 1, wherein a bar code provides an option for a seller user or a buyer user to access data within the system, create an invoice at their POS terminal or on a computer or mobile device and generate a scannable bar code that is displayed on the seller's user interface.

9. The system of claim 1, wherein a buyer user is provided an option to scan a bar code displayed on the seller's user interface using a camera on their mobile device, which automatically loads the invoice into the buyer's user interface.

10. The system of claim 1, wherein a seller is provided an option to create an invoice and the buyer to generate a scannable bar code that is displayed on the buyer's user interface, which the seller is provided an option to scan using a camera device to authorize the transaction.

11. The system of claim 1, wherein the system provides an option for a buyer user to purchase goods or services without the need for carrying physical currency or physical cards.

12. The system of claim 1, wherein the system provides an option for the buyer user to transfer payment to the seller user via a personal computing device while at the seller's POS, or by logging into a seller's POS.

13. The system of claim 1, wherein the system provides an option for authorization of a transaction remotely via presence at a seller's POS and to begin a purchase process.

14. The system of claim 1, wherein the system provides an option for a seller to generate an invoice related to a purchase, and send a payment request to a third-party buyer user not at a POS location for their authorization.

15. The system of claim 1, wherein to protect user accounts, the system is configured to manage an individual user's digital wallet across all of their financial accounts, transfer funds between their accounts integrated into their profile within the system, and transfer funds to the accounts of other users within the system without making a purchase of goods or services, such that the user is provided a configuration to request a transfer of funds from another user within the system, and this request is configured to be sent to another other user's phone number or email address for authorization prior to commencement of a transfer, such that a requesting user is provided a configuration to be presented with a scannable bar code, or a sending user is provide a configuration to provide a scannable bar code, that the other user is provided a configuration to scan to request or authorize such a transfer of funds between users.

16. The system of claim 1, wherein the system is configured to be used for accessing physical currency, at least via accessing electronic funds in a digital wallet to have dispensed as physical currency, and/or such that currency is stored in and dispensed from an existing ATM integrating with the system, and such that the user accesses an ATM user interface installed on an appropriate ATM, and enter a requested withdrawal amount.

17. The system of claim 1, wherein an ATM can send a withdrawal request to a user by displaying a request directly on an ATM, such that the user is provided a configuration to log into their user interface directly through an ATM, and such that the user is provided a configuration to authorize a withdrawal and a deduction of funds from their digital wallet, and such that a withdrawal request is sent to a remote, third-party user, who may authorize the withdrawal request such that physical currency is transferred immediately via the ATM without the need for both users being present.

18. The system of claim 1, wherein a user is able to access electronic funds in their digital wallet to purchase physical goods from vending machines integrating with the system, such that the user accesses a vending machine user interface installed on an appropriate vending machine, and such that the user is presented a configuration to enter a purchase request from a displayed inventory; and wherein a vending machine sends a purchase request to a user by displaying a request directly on the vending machine, such that a user is presented with a configuration to log in to their user interface directly through a vending machine, or via their mobile device, to authorize a purchase and a deduction of funds from their digital wallet, where the vending machine dispenses purchased goods, and such that a purchase request is sent to a remote, third-party user, who is provided a configuration to authorize a purchase request such that physical goods are purchased without a need for the authorizing user to be present, and such that a proprietary software installed on a vending machine comprises a scannable bar code for ease of user access.

19. A wireless payment, money transfer, and vending system used for electronic commerce, comprising:
- a graphical user interface on a computer;
- a personal computing device configured to access, transfer, and withdraw monetary value in real time;
- a mechanism configured to access physical currency via at least one ATM, the ATM integrated with the personal computing device via at least one network connection;
- a plurality of user types associated with a plurality of user settings;
- wherein the user types include at least one of consumers, retailers, distributors, buyers, sellers, individual users, and business users;
- wherein the user interface varies according to a user type selected; and
- wherein an ATM allows a buyer user to log into the system and deposit physical currency funds into their own digital wallet, and allow a buyer user to authorize the payment of a seller user's invoice by depositing physical currency funds into the ATM for immediate transfer to the seller user's account, such that a configuration of the ATM further comprises scannable bar codes for ease of user access, where the system further comprises a transaction tracking system so that a user may view, in real time, progress of any transactions to which they are privy,
- wherein the system is configured to allow a buyer user to log into the system and set their user type as a buyer, and be given access to a buyer user interface, such that from the buyer user interface the buyer user is given the option to enter a plurality of buyer's information, the buyer's information including at least one of payment and financial information, credit card data, bank account data, electronic benefit transfer (EBT) data, and cryptocurrency data.

20. A wireless payment, money transfer, and vending system used for electronic commerce, comprising:
- a graphical user interface on a computer;
- a personal computing device configured to access, transfer, and withdraw monetary value in real time;
- a mechanism configured to access physical currency via at least one ATM, the ATM integrated with the personal computing device via at least one network connection;
- a plurality of user types associated with a plurality of user settings;
- wherein the user types include at least one of consumers, retailers, distributors, buyers, sellers, individual users, and business users;
- wherein the user interface varies according to a user type selected; and
- wherein an ATM allows a buyer user to log into the system and deposit physical currency funds into their own digital wallet, and allow a buyer user to authorize the payment of a seller user's invoice by depositing physical currency funds into the ATM for immediate transfer to the seller user's account, such that a configuration of the ATM further comprises scannable bar codes for ease of user access, where the system further comprises a transaction tracking system so that a user may view, in real time, progress of any transactions to which they are privy;
- and wherein an ATM can send a withdrawal request to a user by displaying a request directly on an ATM, such that the user is provided a configuration to log into their user interface directly through an ATM, and such that the user is provided a configuration to authorize a withdrawal and a deduction of funds from their digital wallet, and such that a withdrawal request is sent to a remote, third-party user, who may authorize the withdrawal request such that physical currency is transferred immediately without the need for both users being present.

* * * * *